United States Patent
Sylvain (10) Patent No.: US 8,571,019 B1
(45) Date of Patent: Oct. 29, 2013

(54) IN-BAND ADDRESS TUNNELING (75) Inventor: Dany Sylvain, Gatineau (CA)

(73) Assignee: Rockstar Consortium US LP, Plano, TX (US)

(*) Notice: Subject to any disclaimer, the term of this patent is extended or adjusted under 35 U.S.C. 154(b) by 1674 days.

(21) Appl. No.: 10/924,512

(22) Filed: Aug. 23, 2004

(51) Int. Cl.
- *H04L 12/66* (2006.01)
- *H04L 12/50* (2006.01)
- *H04Q 11/00* (2006.01)

(52) U.S. Cl.
USPC ............ 370/354; 370/355; 370/356; 370/357

(58) Field of Classification Search
USPC .................................. 370/354, 355, 356, 357
See application file for complete search history.

(56) References Cited

U.S. PATENT DOCUMENTS

| | | | | |
|---|---|---|---|---|
| 6,154,469 | A * | 11/2000 | Boyer et al. ................... | 370/528 |
| 6,389,005 | B1 * | 5/2002 | Cruickshank ................... | 370/352 |
| 6,389,119 | B1 * | 5/2002 | McBride ..................... | 379/93.01 |
| 6,700,884 | B2 * | 3/2004 | Emerson, III ................. | 370/352 |
| 6,801,523 | B1 * | 10/2004 | Osman ......................... | 370/352 |
| 2003/0088619 | A1 * | 5/2003 | Boundy ........................ | 709/204 |
| 2003/0219009 | A1 * | 11/2003 | Unger .......................... | 370/352 |
| 2004/0004957 | A1 * | 1/2004 | Rabipour et al. ............ | 370/352 |

\* cited by examiner

*Primary Examiner* — Marisol Figueroa
(74) *Attorney, Agent, or Firm* — Withrow & Terranova, PLLC (57) ABSTRACT

A packet communication address is delivered through in-band signaling over a circuit-switched network connection for a call, so the packet communication address can be used to establish a packet session outside the circuit-switched network. When the call is initiated from an initiating communication client to a terminating communication client using a directory number associated with the terminating communication client, a portion of the bearer path is established through the circuit-switched network between two network gateways. The packet communication address for the originating communication client may be received in a call establishment request by an originating network gateway. The originating network gateway will use in-band signaling over the bearer path to provide the packet communication address for the originating communication client to a terminating network gateway. Upon receipt of the packet communication address, the terminating network gateway will initiate transferring the call to a packet session established outside the circuit-switched network.

36 Claims, 6 Drawing Sheets

IN-BAND ADDRESS TUNNELING

FIELD OF THE INVENTION

The present invention relates to telephony communications, and in particular to providing an address for a communication client via the bearer path of a circuit-switched network connection.

BACKGROUND OF THE INVENTION

With the evolution of packet-based communications, any type of media may be provided in a packet-based form between any number of communication clients. The flexibility in interacting with various types of communication clients and services allows these communication clients to provide a significantly enhanced feature set over that commonly available over the traditional circuit-switched network. With packet-based multimedia sessions, multiple sessions of different media types can be associated with one another. Documents and files may be transferred in association with an existing audio or video conference. Streaming media may also be exchanged in association with such conferences or other telephony-based media sessions. Further, the communication clients may be implemented in various types of devices, including personal digital assistants and personal computers, in addition to telephony-focused devices. As such, not only do the communication clients often have the ability to handle different types of media sessions, they can provide greater processing capabilities for the information received via the media sessions.

Packet-based telephony has evolved to the point where communication sessions may be established in part over a packet network and in part over the circuit-switched network. When the circuit-switched network is involved, directory numbers are often used to establish at least a portion of the call that is established over the circuit-switched network. The directory numbers may be associated with the end device or with a gateway, which provides an interface between the circuit-switched network and the packet network that supports the communication client receiving the call. Unfortunately, end users have no automated way of determining whether the called party's communication client is a packet-based communication client or a traditional circuit-switched network telephone. As such, the end users typically have to establish a call and discuss the relative capabilities of their respective communication clients. If both communication clients have the ability to support telephony communications over a packet network as well as various multimedia capabilities, the users will exchange the addresses of their respective communication clients, such that a second call may be established to provide a packet-based media session therebetween.

In other situations, the called party's communication client may be multimedia capable, yet be affiliated with a circuit-switched network directory number. When a caller uses the directory number, the multimedia feature set may not be available or may be significantly limited. Further, if the call can be established entirely through the packet network, the number of resources used to route the call in part through the circuit-switched network is reduced. By reducing the transitions between a circuit-switched network and packet-based session or connection, the voice quality is not subject to as much degradation due to the delay, jitter, and conversions during the transitions from packet-based to Time Division Multiplexed (TDM) communications.

Accordingly, there is a need for a way in which the communication clients can automatically detect each other's capabilities and cause the existing telephony call to be established entirely through the packet network when both communication clients have such capabilities. There is a further need for the communication clients to automatically exchange their respective addresses and capabilities, such that sessions may be established between the communication clients in an efficient manner.

SUMMARY OF THE INVENTION

The present invention provides for delivering a packet communication address through in-band signaling over a circuit-switched network connection for a call, such that the packet communication address can be used to establish a packet session outside of the circuit-switched network. When the call is being initiated from an initiating communication client to a terminating communication client using a directory number associated with the terminating communication client, at least a portion of the bearer path for the call is established between two network gateways and through the circuit-switched network. The packet communication address for the originating communication client may be contained in a request to establish the call by an originating network gateway, which interfaces with the originating communication client. The originating network gateway will use in-band signaling over the bearer path to provide the packet communication address for the originating communication client to a terminating network gateway, which interfaces with the terminating communication client. Upon receipt of the packet communication address, the terminating network gateway may initiate a packet-based communication with the originating gateway. The terminating network gateway may take the additional step of transferring the existing circuit-switched portion of the call to a packet session established outside of the circuit-switched network. The terminating network gateway may obtain the packet communication address for the terminating communication client and use the packet communication addresses for both the originating and terminating communication clients to assist in establishing the packet session between the originating and terminating communication clients. The in-band signaling may employ bit stealing or bit replacement to effect the in-band signaling. Preferably, the in-band signaling will have minimal impact on the voice quality associated with the call while the in-band signaling occurs.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
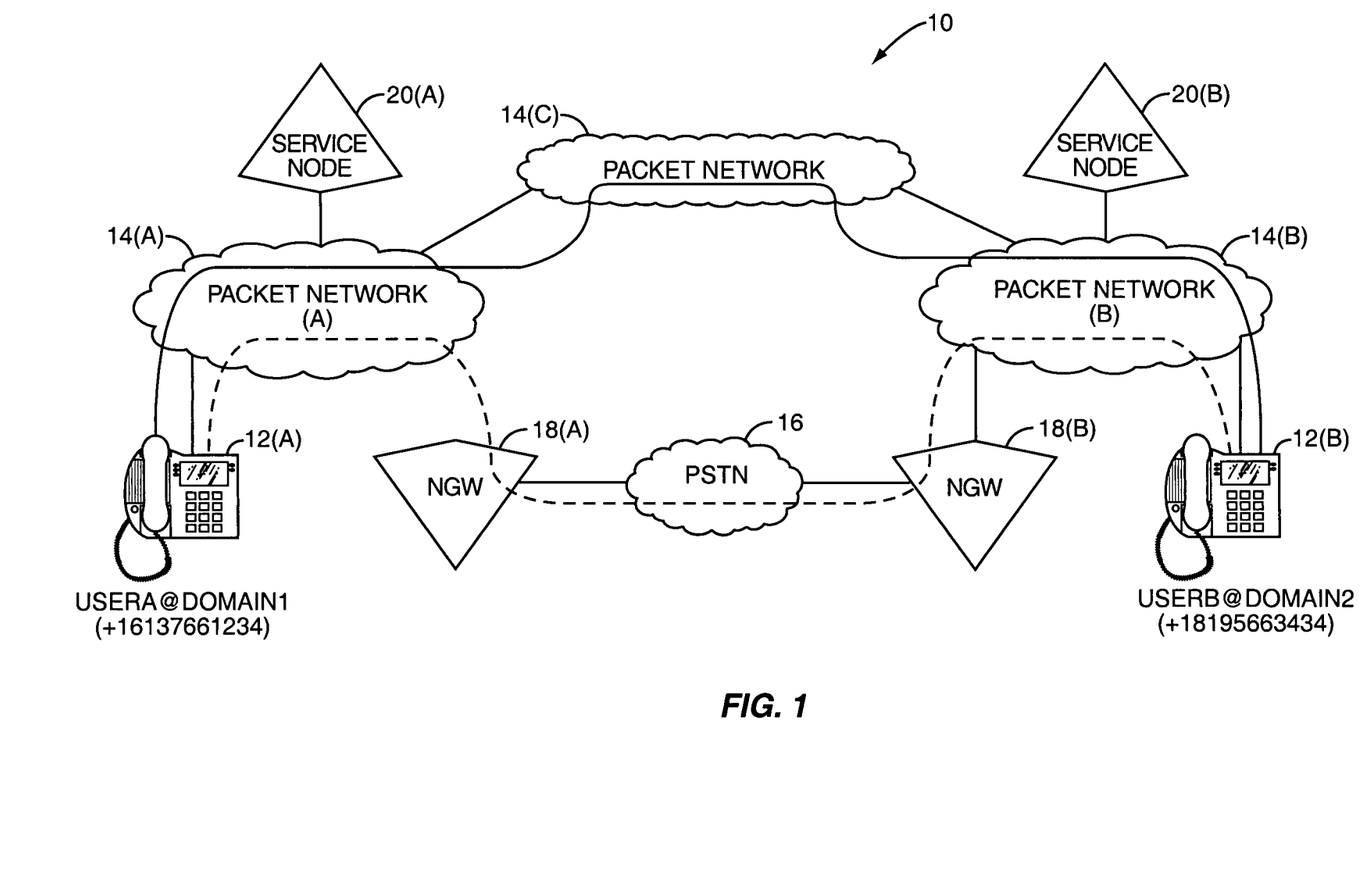
FIG. 1 is a block representation of a communication environment according to one embodiment of the present invention.

With reference to FIG. 1, a communication environment 10 is illustrated according to one embodiment of the present invention. As illustrated, communication clients 12 (A and B) are coupled to their respective packet networks 14 (A and B), which are interconnected by packet network 14C. The communication clients 12A and 12B can establish a packet-based packet communication session therebetween via the packet networks 14 (A, B, and C) as represented by the solid line connecting communication clients 12A and 12B. Alternatively, communications between the communication clients 12A and 12B may be established in part over the circuit-switched network 16, which may be TDM-based or packet-based in part. In either a TDM or packet-based configuration, the circuit-switched network 16 is used to establish circuit mode bearer paths between network gateways (NGWs) 18 (A and B), which provide an interface between the circuit-switched network 16 and the respective packet networks 14 (A and B). The network gateways 18 (A and B) will essentially convert bearer path traffic between a circuit mode format and a packet-based format. In a typical configuration, the circuit-switched network 16 carries 64 kbps traffic according to the traditional North American Telephony Standards. In general, call signaling between various entities in the communication environment 10 will result in a circuit mode connection over the circuit-switched network 16 between network gateways 18A and 18B, and packet-based sessions between the respective network gateways 18 (A and B) and communication clients 12 (A and B) via packet networks 14 (A and B), respectively. Service nodes 20A and 20B are provided to assist with call signaling and routing as will be discussed in greater detail below.

For the illustrated example, assume that communication client 12A is associated with a packet-based address of USERA@DOMAIN1 and a circuit mode directory number of 613-766-1234. Communication client 12B is associated with a packet mode address of USERB@DOMAIN2 and a circuit-switched network directory number of 819-566-3434. Calls between the communication clients 12A and 12B that are originated using the circuit-switched network directory number will be routed through the circuit-switched network 16 and the network gateways 18A and 18B. Calls originating using the packet-based addresses will be established through the packet networks 14 (A, B, and C), without traversing the circuit-switched network 16 or the network gateways 18 (A and B).

Since most telephony communications today are initiated using circuit-switched network-based directory numbers, User A, who is associated with communication client 12A, will likely originate a call to User B using the circuit-switched network directory number (819-566-3434), unless User A knows that User B's communication client 12B is capable of packet-based communications, and more importantly, capable of establishing a telephony session over a packet session. Traditionally, User A would have to originate a call to User B using the circuit-switched network directory number, determine that User B's communication client 12B has packet-based capabilities, end the current call, and initiate a second call to communication client 12B using the packet-based address (USERB@DOMAIN2). This process has proven to be manually intensive and cumbersome.

The present invention provides for an automated technique for recognizing the capabilities of User B's communication client 12B, providing the address and other relevant information relating to communication client 12B, using the obtained information to automatically establish a packet communication session between communication clients 12A and 12B, and transferring the original call to the newly established session.

Figure 2A:
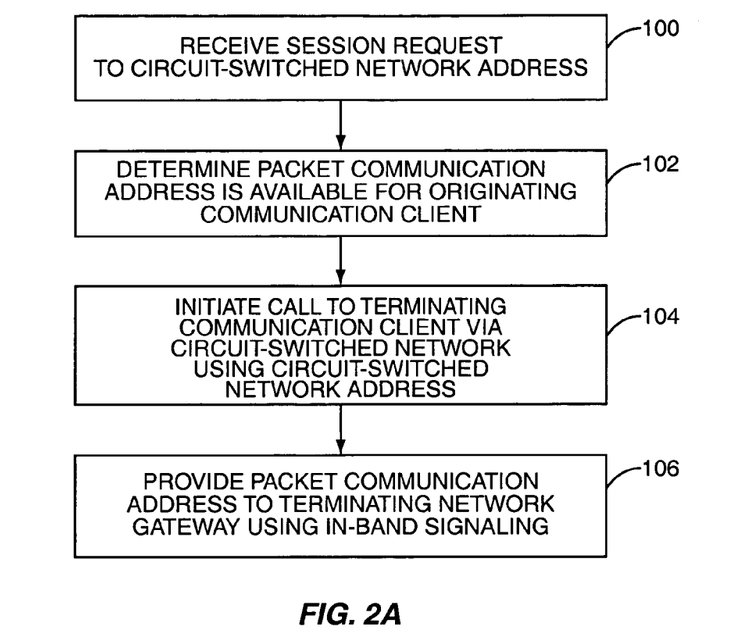
FIG. 2A is a flow diagram outlining an exemplary process from an originating network gateway perspective according to one embodiment of the present invention.
Figure 2B:
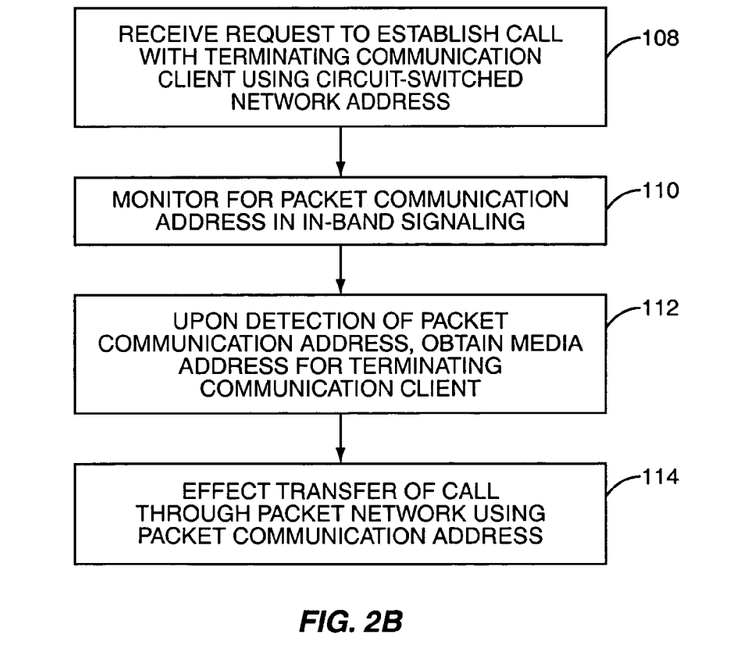
FIG. 2B is a flow diagram outlining an exemplary process from a terminating network gateway perspective according to one embodiment of the present invention.

In one embodiment of the present invention, the network gateways 18 cooperate to provide in-band signaling within the bearer path traffic to determine whether the communication client 12B to which the call is intended (the terminating communication client) has packet-based capabilities, as well as obtain the address for the terminating communication client 12B including any port or special addressing information. FIGS. 2A and 2B provide an overall flow for such a scenario. The flow of FIG. 2A is from the originating network gateway's perspective (18A), whereas the flow of FIG. 2B is from the terminating network gateway's perspective (18B).

As shown in FIG. 2A, the originating network gateway 18A will initially receive a session request destined for a circuit-switched network address, which is typically a directory number, to which a call from communication client 12A is directed (step 100). The originating network gateway 18A will determine whether a packet communication address is available for the originating communication client 12A (step 102). The packet communication address may be a SIP address, an H.323 address, an SDP address, or an IP address. The originating network gateway 18A will then initiate a call over the circuit-switched network 16 toward the terminating communication client 12B via the circuit-switched network 16 using the circuit-switched network address (step 104). Since the terminating communication client 12B is supported by packet network 14B, the call over the circuit-switched network 16 is directed to the terminating network gateway 18B. Assuming the originating communication client 12A has an available packet communication address, the originating network gateway 18A will provide the packet communication address to the terminating network gateway 18B using in-band signaling within the bearer path, which is established between the originating and terminating network gateways 18A and 18B, respectively, over the circuit-switched network 16 (step 106).

With reference to FIG. 2B, the terminating network gateway 18B will initially receive a request to establish a call from the originating network gateway 18A using the circuit-switched network address (step 108). Once a connection over the circuit-switched network 16 is established between the originating and terminating network gateways 18A and 18B, the terminating network gateway 18B will monitor for the packet communication address provided within the bearer channel using in-band signaling (step 110). Upon detection of the packet communication address for the originating communication client 12A, the terminating network gateway 18B will obtain a packet communication address for the terminating communication client 12B (step 112) and effect transfer of the call through the packet networks 14A, 14B, and 14C (step 114). No portion of the bearer path for the transferred call will extend through the circuit-switched network 16 or the network gateways 18A and 18B. Instead of transferring the call to the circuit-switched connection, the packet-based session may be used for exchanging information related to the call, and the information may include audio, video, data, files, and messages. Notably, the in-band signaling and delivery of information may take place in either direction.

Figure 3A:
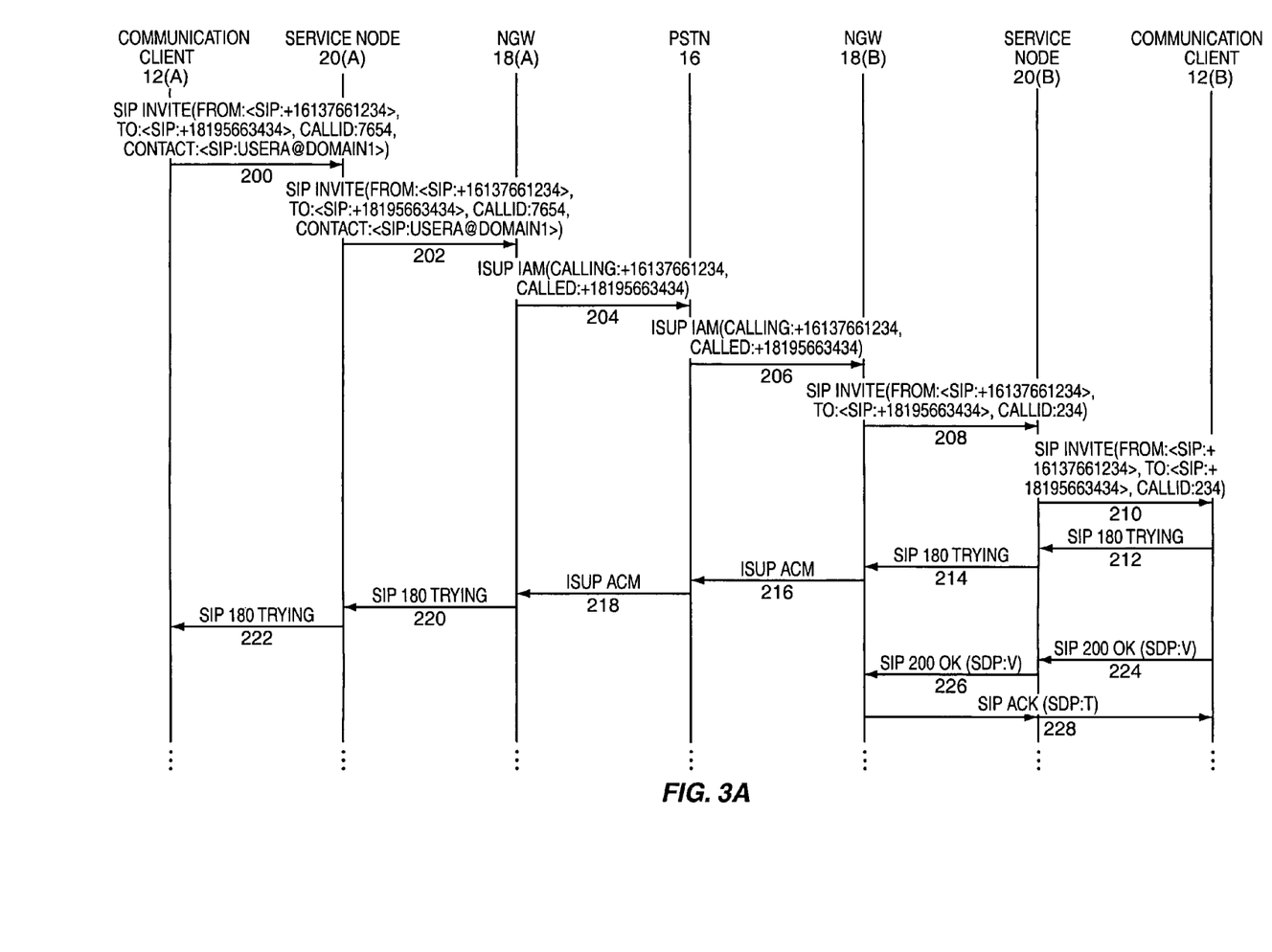
FIGS. 3A-3C illustrate a communication flow diagram illustrating an exemplary communication flow according to one embodiment of the present invention.
Figure 3B:
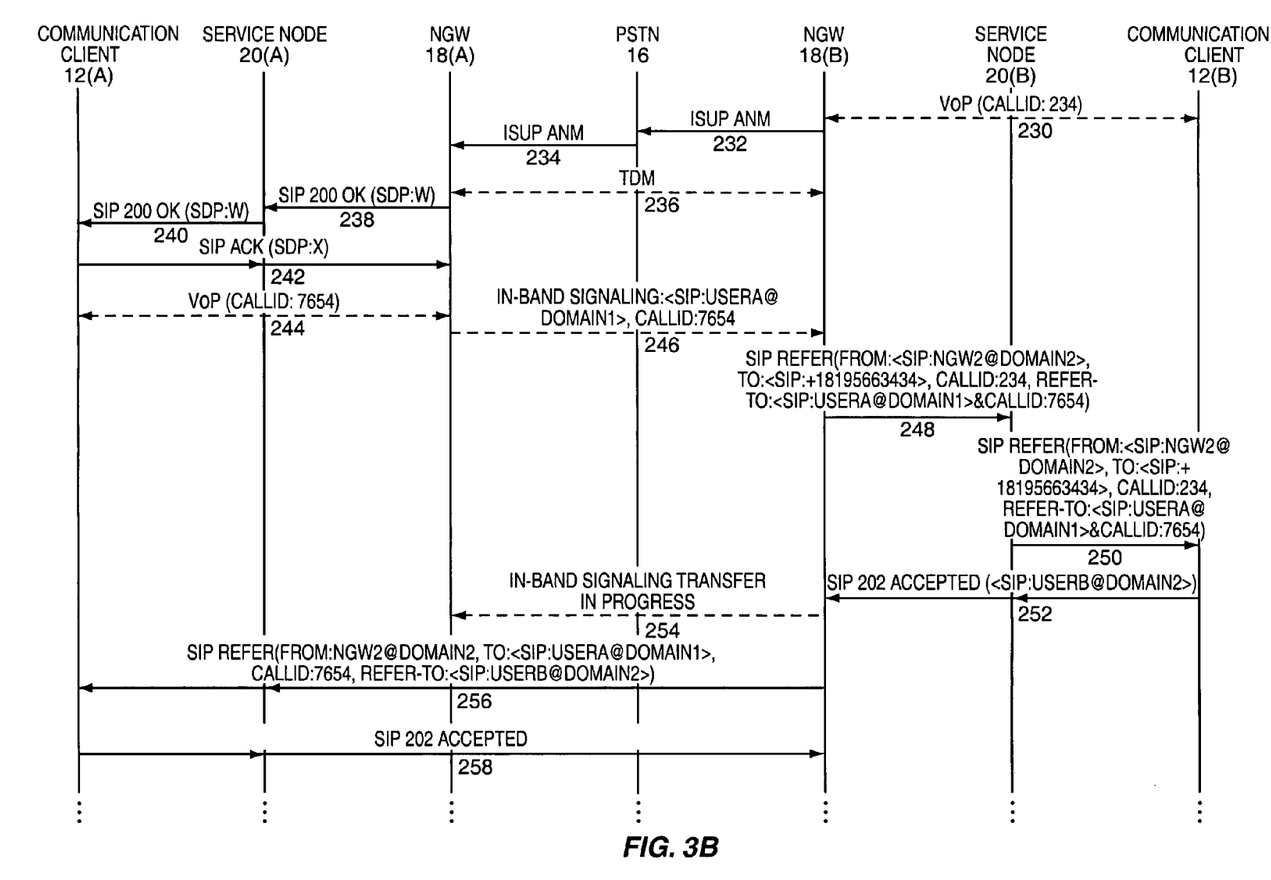
Figure 3C:
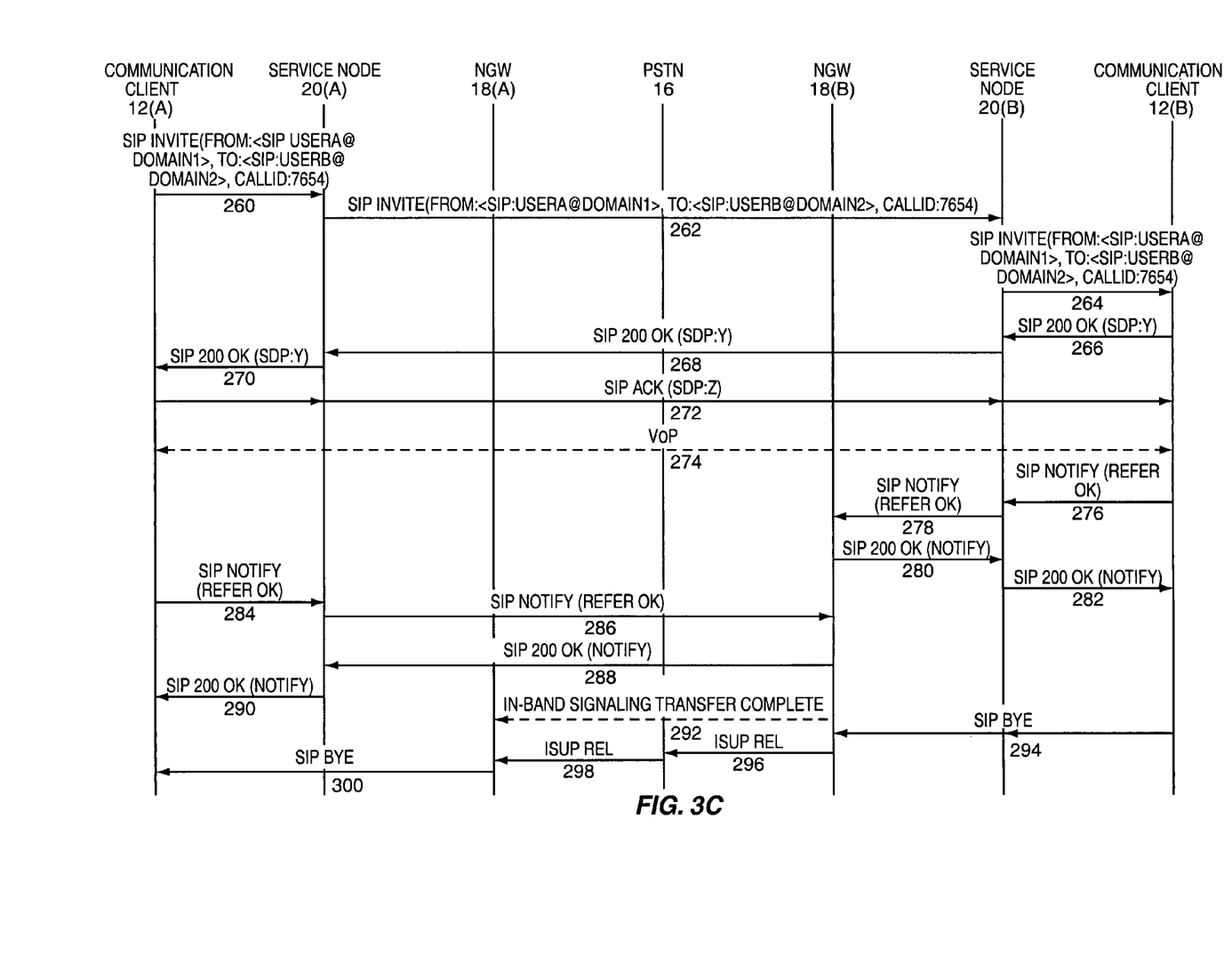

Turning now to FIGS. 3A-3C, a detailed communication flow is provided according to one exemplary scenario of the present invention. In general, a call is established between the originating communication client 12A and the terminating communication client 12B through the circuit-switched network 16 and the network gateways 18A and 18B. The originating network gateway 18A will use in-band signaling to provide the packet communication address for communication client 12A to the terminating network gateway 18B, which will provide the packet communication address for the originating communication client 12A to communication client 12B, directly or indirectly, as well as obtain the packet communication address for the terminating communication client 12B. Using the packet communication addresses for communication clients 12A and 12B, the terminating network gateway 18B will initiate a transfer of the call established over the circuit-switched network 16 to one established purely over the packet networks 14A, 14B, and 14C. Further, the exemplary communication flow uses the Session Initiation Protocol (SIP), but those skilled in the art will recognize that other session control protocols are applicable.

Initially, communication client 12A will initiate a call to communication client 12B by sending a SIP Invite message indicating that the call is from directory number 613-766-1234 and is intended for directory number 819-566-3434. The SIP Invite message will also include a call identifier (CALLID: 7654) and the packet communication address for communication client 12A, which is USERA@DOMAIN1 (step 200). The service node 20A acts as a SIP proxy, and since the call is intended for a directory number associated with the circuit-switched network 16, a SIP Invite message is sent toward the originating network gateway 18A, which provides an interface for the packet network 14A to the circuit-switched network 16 (step 202). The originating network gateway 18A will receive the SIP Invite message and initiate an Integrated Services User Part (ISUP) Initial Address Message (IAM) indicating that the calling party is associated with directory number 613-766-1234 and the called party is associated with directory number 819-566-3434 (step 204). The ISUP IAM is propagated through the circuit-switched network 16 to the terminating network gateway 18B, which supports the called party's directory number (step 206). Network gateway 18B will initiate a SIP Invite message over packet network 14B toward communication client 12B. In a SIP configuration, the SIP Invite message is received by service node 20B, which is acting as a SIP proxy (step 208) and forwarded to communication client 12B (step 210). Notably, the SIP Invite message is associated with a different CALLID (234). Communication client 12B will respond with a SIP 180 Trying message, which is sent to the terminating network gateway 18B through service node 20B (steps 212 and 214). The SIP 180 Trying message will alert network gateway 18B that communication client 12B is ringing or otherwise providing an incoming call alert. Network gateway 18B will then send an ISUP Address Complete Message (ACM) in response to the ISUP IAM (step 216). The ISUP ACM is propagated through the circuit-switched network 16 to the originating network gateway 18A (step 218). The originating network gateway 18A will then send a SIP 180 Trying message toward communication client 12A via service node 20A (steps 220 and 222).

Once communication client 12B is answered, a SIP 200 OK message is sent toward network gateway 18B through service node 20B (steps 224 and 226). The SIP 200 OK message may include a Session Data Protocol (SDP) identifier indicating the packet communication information (V) of communication client 12B. Network gateway 18B will respond by sending a SIP Acknowledgement (ACK) message back to communication client 12B through service node 20B (step 228). The SIP Acknowledgement message will include the packet communication information of network gateway 18B (T) in the SDP field. As such, a voice-over-packet (VoP) session is established between the terminating network gateway 18B and communication client 12B (step 230). This packet-based connection, which is established over packet network 14B, is associated with CALLID 234, and voice packets are sent back and forth between the terminating network gateway 18B and communication client 12B using the corresponding SDP parameters. The terminating network gateway 18B will send an ISUP Answer Message (ANM) through the circuit-switched network 16 (step 232) to the originating network gateway 18A (step 234), wherein a TDM connection is established over the circuit-switched network 16 between the originating and terminating network gateways 18A and 18B (step 236).

The originating network gateway 18A will send a SIP 200 OK message toward communication client 12A via service node 20A to indicate the call has been answered (steps 238 and 240). The packet communication information (W) of the originating network gateway 18A is sent in the SDP parameters of the SIP 200 OK message. Communication client 12A will respond with a SIP Acknowledgement message, including its packet communication information (X), which is sent to the originating network gateway 18A through service node 20A (step 242). At this point, a bidirectional VoP session is established between communication client 12A and the originating network gateway 18A (step 244). The VoP session is associated with the CALLID 7654. At this point, a packet session is established between communication client 12A and the originating network gateway 18A over packet network 14A, a circuit-switched network connection is established over the circuit-switched network 16 between the originating network gateway 18A and the terminating network gateway 18B, and a VoP session is established between the terminating network gateway 18B and communication client 12B over packet network 14B. These three connections are effectively coupled to one another through the network gateways 18A and 18B to establish a bearer path between communication clients 12A and 12B for the call.

Once the circuit-switched network portion of the bearer path is established between the originating network gateway 18A and the terminating network gateway 18B, the originating network gateway 18A can use in-band signaling to provide the packet communication address for communication client 12A to the terminating network gateway 18B. The CALLID associated with the packet session between communication client 12A and the originating network gateway 18A can be included to allow the terminating network gateway 18B to associate the packet communication address with the appropriate call or with terminating communication client 12B. The in-band signaling may take many forms. In one embodiment, a bit stealing or bit insertion technique is used to provide information from the originating network gateway 18A to the terminating network gateway 18B. Since the information carried across the circuit-switched network portion of the bearer path is digitized, whether being transported in a circuit-switched or packet-based mode, one or more bits in the voice information being transmitted may be replaced with bits corresponding to the information to be transferred between the originating network gateway 18A and the terminating network gateway 18B. The information will be inserted in a predefined manner, such that the terminating network gateway 18B can monitor and detect the information. Preferably, the information is injected into the voice information in a manner having a minimal impact on voice quality.

In a typical circuit-switched network, voice information is digitized using a G.711 codec, generating 8-bit byte voice sample every 125 ms to be sent in a designated frame corresponding to the bearer channel for the call. In one embodiment of the present invention, one or more of the least significant bits are used to provide the in-band signaling. As such, the network gateways 18 can effectively steal one or more of the least significant bits of a byte of voice information every frame or every few frames to provide a signaling channel within the bearer channel created within the network gateways 18 and through the circuit-switched network 16. An exemplary bit stealing technique is outlined in telephony standard 3GPP TS 28.062 v5.4.0 (2003-09), which is incorporated herein by reference in its entirety. Since the circuit-switched network 16 typically transmits bytes of information whether or not voice information is present, the in-band signaling may take place during the call setup, once the circuit-switched network portion of the bearer path is established between the originating and terminating network gateways 18A and 18B, respectively, or during the call when voice information is being transferred across the circuit-switched network 16.

Continuing with FIG. 3B, once the circuit-switched network portion of the bearer path is established between network gateways 18A and 18B, the originating network gateway 18A can use in-band signaling to provide the packet communication address and other relevant information to the terminating gateway 18B (step 246) (alternatively, the terminating network gateway 18B may initiate the process). Network gateway 18B will then attempt to initiate a transfer of the circuit-switched network-based call to a packet-based call, if the terminating communication client 12B has such capability. Initially, a SIP Refer message may be sent toward the terminating communication client 12B through service node 20B (steps 248 and 250). The SIP Refer message will include the terminating network gateway's packet communication address (NGW2@DOMAIN2), the directory number for the terminating communication client 12B, and the CALLID for the session established over packet network 14B, as well as the packet communication address for the originating communication client 12A and the CALLID associated with the packet session established over packet network 14A. The terminating communication client 12B will respond with a SIP 202 Accepted message, which includes the packet communication address for the terminating communication client 12B (step 252). At this point, the terminating network gateway 18B may use in-band signaling to alert to the originating network gateway 18A that a transfer is in progress (step 254). Further, the terminating network gateway 18B will send a SIP Refer message toward communication client 12A to initiate the transfer (step 256). The SIP Refer message will provide the originating communication client 12A with the packet communication address of the terminating communication client 12B, as well as the CALLID of the packet session between communication client 12A and the originating network gateway 18A. Communication client 12A will respond with a SIP 202 Accepted message (step 258) and then initiate a packet session over packet network 14C with communication client 12B.

The session is initiated with a SIP Invite message sent from USERA@DOMAIN1 to USERB@DOMAIN2 and associated with the CALLID 7654 (step 260). The SIP Invite message is received by service node 20A and forwarded toward the terminating communication client 12B (step 262). The forwarded SIP Invite message is received by service node 20B and forwarded to the terminating communication client 12B (step 264). The terminating communication client 12B will respond with a SIP 200 OK message providing the SDP parameters (Y) for the terminating communication client 12B (step 266). The SIP 200 OK message is received by service node 20B and forwarded to the originating communication client 12A via service node 20A (steps 268 and 270). The originating communication client 12A will respond with a SIP Acknowledgement message including the SDP parameters (Z) for the originating communication client 12A (step 272). The SIP Acknowledgement message is sent to the terminating communication client 12B via service nodes 20A and 20B. At this point, a VoP session is established between communication client 12A and communication client 12B via packet networks 14A, 14B, and 14C, without traversing the circuit-switched network 16 or the network gateways 18A and 18B (step 274).

Upon establishment of the VoP session between the originating and terminating communication clients 12A and 12B, the terminating communication client 12B will send a SIP Notify message toward the terminating network gateway 18B via service node 20B to indicate that the transfer (Refer) was completed (steps 276 and 278). The terminating network gateway 18B will respond by sending a SIP 200 OK message to the terminating communication client 12B via service node 20B (steps 280 and 282). Similarly, the originating communication client 12A will send a SIP Notify message toward the terminating network gateway 18B via service node 20A indicating the transfer was completed (steps 284 and 286). The terminating network gateway 18B will respond by sending a SIP 200 OK message back to the originating communication client 12A via service node 20A (steps 288 and 290). At this point, the terminating network gateway 18B may use in-band signaling to send appropriate notification that the call has been transferred successfully to the originating network gateway 18A (step 292).

To release the circuit-switched network-based connection, communication client 12B will send a SIP Bye message to the terminating network gateway 18B via service node 20B (step 294). In turn, the terminating network gateway 18B will send an ISUP Release (REL) message through the circuit-switched network 16 toward the originating network gateway 18A (steps 296 and 298). The bearer path via the circuit-switched network 16 is torn down, and the originating network gateway 18A will send a SIP Bye message to the originating communication client 12A (step 300). At this point, the packet session between communication client 12A and network gateway 18A, as well as the packet session between communication client 12B and network gateway 18B, are ended along with the circuit-switched network portion of the original call.

Those skilled in the art will recognize various types of in-band signaling techniques, as well as different protocols and techniques for handling call control between the various entities described above. Further, the functionality provided by any of these devices may be distributed or concentrated to various degrees. For example, the network gateways 18 may be supported by one or more entities that provide separate call signaling and bearer path control. Further, the network gateways 18 may interact with various signaling entities of the circuit-switched network 16 as well as the packet networks 14 as necessary to implement the various concepts of the present invention.

Figure 4:
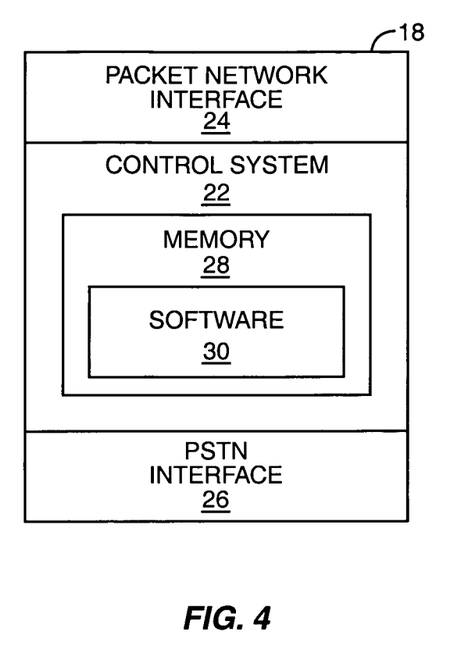
FIG. 4 is a block representation of a network gateway according to one embodiment of the present invention.

Turning now to FIG. 4, a block representation of a network gateway 18 is provided according to one embodiment of the present invention. The network gateway 18 will include a control system 22 associated with a packet network interface 24 as well as a circuit-switched network interface 26. The packet network interface 24 will be coupled to a packet network 14, wherein the circuit-switched network interface 26 will be coupled to the circuit-switched network 16. The control system 22 will cooperate with the packet network interface 24 and the circuit-switched network interface 26 to provide the requisite interworking between the packet network 14 and the circuit-switched network 16. Such interworking will include adaptation of VoP information to circuit mode or circuit-switched techniques supported by the circuit-switched network 16. The control system 22 will include memory 28 with the requisite software 30 to facilitate operation as described above.

Those skilled in the art will recognize improvements and modifications to the preferred embodiments of the present invention. All such improvements and modifications are considered within the scope of the concepts disclosed herein and the claims that follow.

What is claimed is:

1. A method of operating a gateway comprising:
  a) receiving a request over a packet network from a service node to establish a call from a first communication client to a second communication client using a directory number associated with the second communication client, the request including a packet communication address associated with the first communication client;
  b) establishing a circuit-switched connection, which forms a portion of a bearer path for the call, over a circuit-switched telephone network with a network gateway associated with the second communication client;
  c) providing to the network gateway information bearing on the packet communication address for the first communication client using in-band signaling over the circuit-switched connection;
  d) effecting a transfer of the bearer path connection from the circuit-switched connection to a packet-switched connection; and
  e) receiving, via in-band signaling over the circuit-switched connection, information indicating that the call has been transferred, wherein traffic over the portion of the bearer path is digitized and transported in frames using a digital format comprising a plurality of bits, and the in-band signaling comprising replacing at least one of the plurality of bits in select ones of the frames with information corresponding to the packet communication address.

2. The method of claim 1 wherein the first and second communication clients are associated with directory numbers and the second communication client is associated with a packet communication address.

3. The method of claim 1 wherein a least significant bit of the digital format is replaced.

4. The method of claim 1 wherein a plurality of least significant bits of the digital format is replaced.

5. The method of claim 1 wherein the traffic is transported using time division multiplexing.

6. A method of operating a gateway comprising:
  a) receiving a request over a packet-based network to establish a call from a first communication client to a second communication client using a directory number associated with the second communication client, the request including a packet communication address associated with the first communication client;
  b) forwarding the request towards the second communication client via a service node;
  c) establishing a circuit-switched connection, which forms a portion of a bearer path for the call, over a circuit-switched telephone network with a first network gateway associated with the first communication client;
  d) establishing a packet connection with the second communication client over the packet-based network;
  e) receiving information from the first network gateway bearing on the packet communication address for the first communication client using in-band signaling over the circuit-switched connection;
  f) transferring the call from the portion of the bearer path to a packet-based session; and
  g) providing, via in-band signaling over the circuit-switched connection, information indicating that the call has been transferred, wherein traffic over the portion of the bearer path is digitized and transported in frames using a digital format comprising a plurality of bits, and the in-band signaling comprising replacing at least one of the plurality of bits in select ones of the frames with information corresponding to the packet communication address.

7. The method of claim 6 wherein the first and second communication clients are associated with directory numbers and the second communication client is associated with a packet communication address.

8. The method of claim 6 further comprising obtaining the packet communication address for the second communication client.

9. The method of claim 6 further comprising keeping the call on the circuit-switched bearer path and using the packet-based session for exchanging packet-based information related to the call.

10. The method of claim 6 further comprising dropping the bearer path upon transferring the call to the packet-based session.

11. The method of claim 6 wherein the call is transferred in an automated fashion to the packet-based session without disrupting the call.

12. The method of claim 6 wherein the packet-based session does not traverse the circuit-switched telephone network.

13. The method of claim 6 wherein the call is established prior to receiving the information using the in-band signaling.

14. The method of claim 6 wherein the portion of the bearer path is established prior to the in-band signaling.

15. The method of claim 6 wherein a least significant bit of the digital format is replaced.

16. The method of claim 6 wherein a plurality of least significant bits of the digital format is replaced.

17. The method of claim 6 wherein the traffic is transported using time division multiplexing.

18. The method of claim 6, further comprising:
  h) releasing the circuit-switched connection and the packet connection after the call has been transferred.

19. A gateway comprising:
  a) a plurality of communication interfaces; and b) a control system associated with the plurality of communication interfaces and configured to:
  i) receive a request over a packet network from a service node to establish a call from a first communication client to a second communication client using a directory number associated with the second communication client, the request including a packet communication address associated with the first communication client;
  ii) establish a circuit-switched connection, which forms a portion of a bearer path for the call, over a circuit-switched telephone network with a network gateway associated with the second communication client;
  iii) establish a packet connection, which forms the portion of the bearer path for the call, over the packet network with the first communication client;
  iv) provide to the network gateway information bearing on the packet communication address for the first communication client using in-band signaling over the circuit-switched connection;
  v) effect a transfer of the bearer path connection from the circuit-switched connection to a packet-switched connection; and
  vi) receive, via in-band signaling over the circuit-switched connection, information indicating that the call has been transferred, wherein traffic over the portion of the bearer path is digitized and transported in frames using a digital format comprising a plurality of bits, and the in-band signaling comprising replacing at least one of the plurality of bits in select ones of the frames with information corresponding to the packet communication address.

20. The system of claim 19 wherein the first and second communication clients are associated with directory numbers and the second communication client is associated with a packet communication address.

21. The system of claim 19 wherein a least significant bit of the digital format is replaced.

22. The system of claim 19 wherein a plurality of least significant bits of the digital format is replaced.

23. The system of claim 19 wherein the traffic is transported using time division multiplexing.

24. The gateway of claim 19, wherein the control system is further adapted to:
  vii) release the circuit-switched connection and the packet connection after the call has been transferred.

25. A gateway comprising:
a) a plurality of communication interfaces; and
b) a control system associated with the plurality of communication interfaces and configured to:
  i) receive a request over a packet network to establish a call from a first communication client to a second communication client using a directory number associated with the second communication client, the request including a packet communication address associated with the first communication client;
  ii) forward the request towards the second communication client via a service node;
  iii) establish a circuit-switched connection, which forms a portion of a bearer path for the call, over a circuit-switched telephone network with a first network gateway associated with the first communication client;
  iv) establish a packet connection, which forms the portion of the bearer path for the call, over the packet network with the second communication client;
  v) transfer the call from the portion of the bearer path to a packet-based session; and
  vi) provide, via in-band signaling over the circuit-switched connection, information indicating that the call is being transferred, wherein traffic over the portion of the bearer path is digitized and transported in frames using a digital format comprising a plurality of bits, and the in-band signaling comprising replacing at least one of the plurality of bits in select ones of the frames with information corresponding to the packet communication address.

26. The system of claim 25 wherein the first and second communication clients are associated with directory numbers and the second communication client is associated with a packet communication address.

27. The system of claim 25 further comprising obtaining the packet communication address for the second communication client.

28. The system of claim 25 wherein the control system is further adapted to effect a transfer of the call to the packet-based session established between the first communication client and the second communication client using the packet communication address, which was received via the in-band signaling, for the first communication client.

29. The system of claim 28 wherein the control system is further adapted to drop the bearer path upon transferring the call to the packet-based session.

30. The system of claim 28 wherein the call is transferred to the packet-based session without disrupting the call in an automated fashion.

31. The system of claim 28 wherein the packet-based session does not traverse the circuit-switched telephone network.

32. The system of claim 25 wherein the call is established prior to receiving the information using the in-band signaling.

33. The system of claim 25 wherein the portion of the bearer path is established prior to the in-band signaling.

34. The system of claim 25 wherein a least significant bit of the digital format is replaced.

35. The system of claim 25 wherein a plurality of least significant bits of the digital format is replaced.

36. The system of claim 25 wherein the traffic is transported using time division multiplexing.

* * * * *